(12) United States Patent  
Schulte

(10) Patent No.: US 8,181,310 B2  
(45) Date of Patent: May 22, 2012

(54) CASTER BRAKE ASSEMBLY

(75) Inventor: John K. Schulte, Lake St. Louis, MO (US)

(73) Assignee: Fredman Bros. Furniture Company, Inc., St. Louis, MO (US)

( * ) Notice: Subject to any disclaimer, the term of this patent is extended or adjusted under 35 U.S.C. 154(b) by 251 days.

(21) Appl. No.: 12/658,763

(22) Filed: Feb. 12, 2010

(65) Prior Publication Data

US 2011/0197395 A1     Aug. 18, 2011

(51) Int. Cl.  
*B60B 33/00*       (2006.01)

(52) U.S. Cl. ........................................................ 16/35 R

(58) Field of Classification Search ............... 16/25 R, 16/35 D, 45, 44, 47, 48, 35 R; 188/1.12, 188/29, 31, 69; 280/64, 65, 63, 78, 79  
See application file for complete search history.

(56) References Cited

U.S. PATENT DOCUMENTS

| | | | | |
|---|---|---|---|---|
| 2,170,257 A | * | 8/1939 | Andersen | 16/31 R |
| 3,210,795 A | * | 10/1965 | Fontana et al. | 16/43 |
| 3,818,541 A | * | 6/1974 | Daniels | 16/18 A |
| 3,942,608 A | | 3/1976 | Frank et al. | |
| 4,805,259 A | | 2/1989 | Kassai | |
| 5,568,671 A | * | 10/1996 | Harris et al. | 16/18 R |
| 5,632,360 A | * | 5/1997 | Melara | 188/1.12 |
| 5,785,154 A | * | 7/1998 | Chen | 188/1.12 |
| 6,532,624 B1 | * | 3/2003 | Yang | 16/35 R |
| 7,546,662 B2 | * | 6/2009 | Frame | 16/47 |
| 7,707,686 B2 | * | 5/2010 | Chou | 16/35 R |
| 7,937,805 B2 | * | 5/2011 | Tsai | 16/47 |
| 2009/0113671 A1 | * | 5/2009 | Chu | 16/35 R |

* cited by examiner

*Primary Examiner* — Chuck Y. Mah  
*(74) Attorney, Agent, or Firm* — David H. Chervitz

(57) ABSTRACT

A caster brake assembly is disclosed which comprises a yoke having a stem, a wheel rotatably supported by the yoke the wheel having a pair of interior rims with the rims having teeth, and a lock lever installed on the yoke having gears that are adapted to engage the teeth to prevent movement of the wheel.

20 Claims, 6 Drawing Sheets

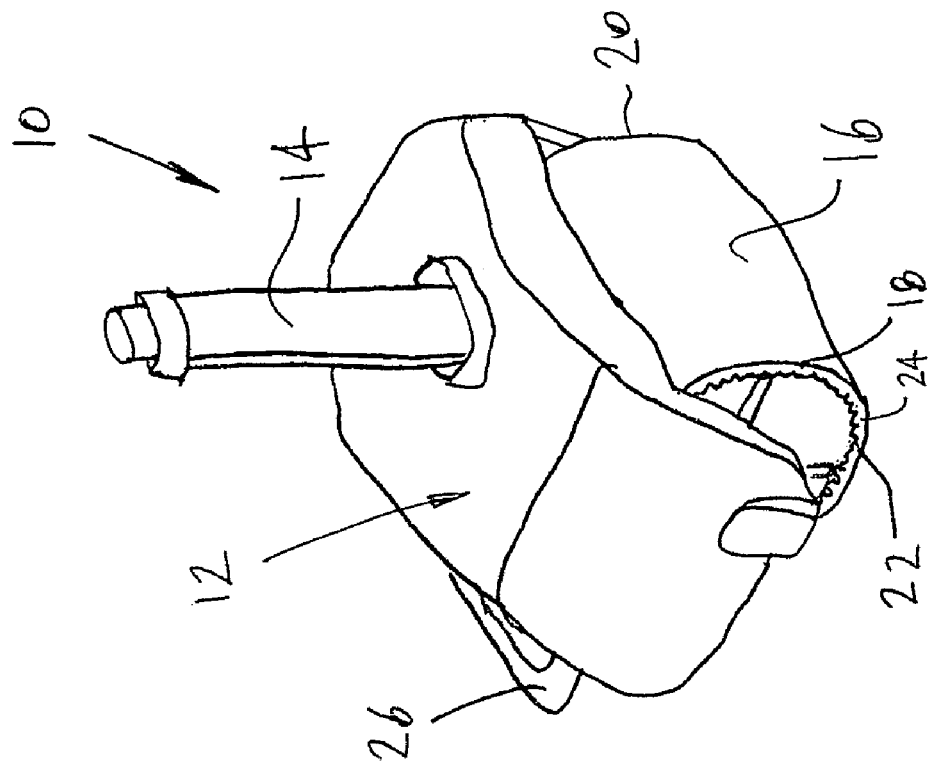
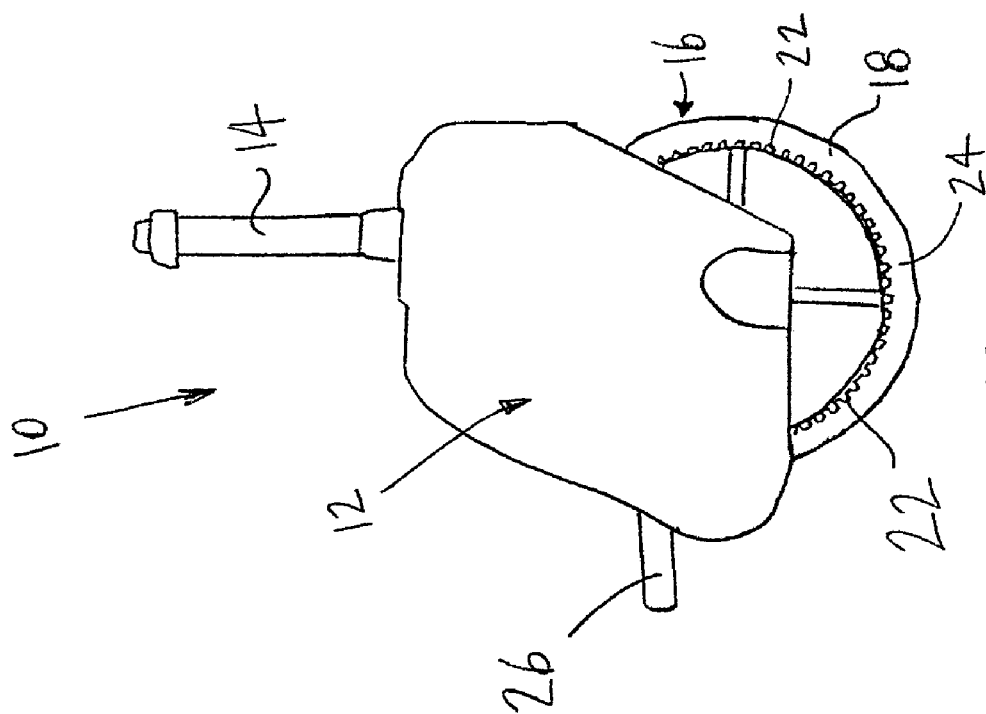

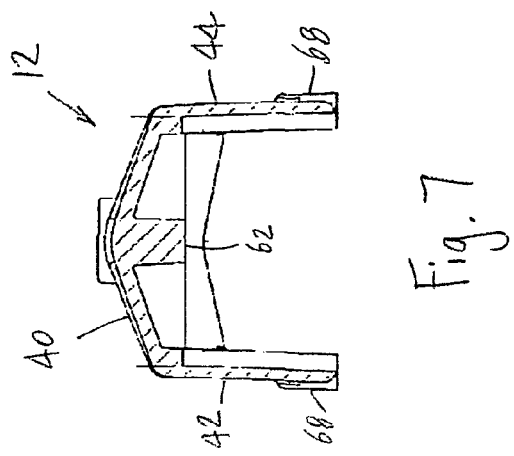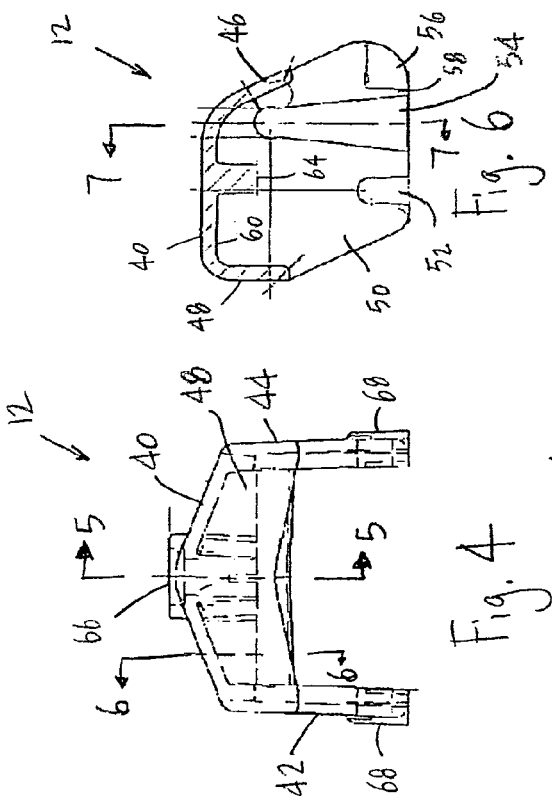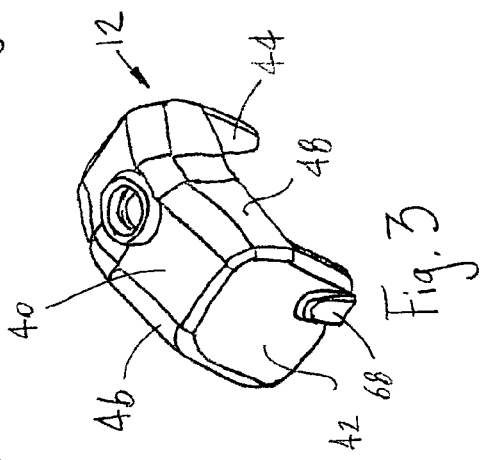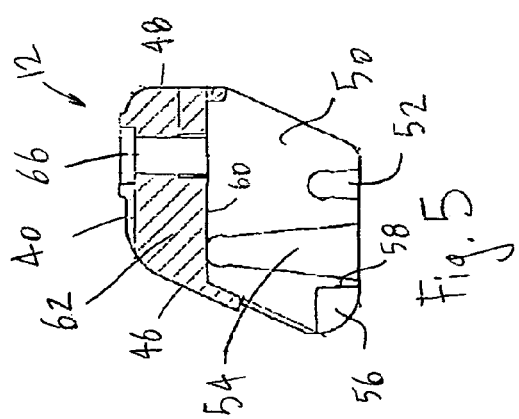

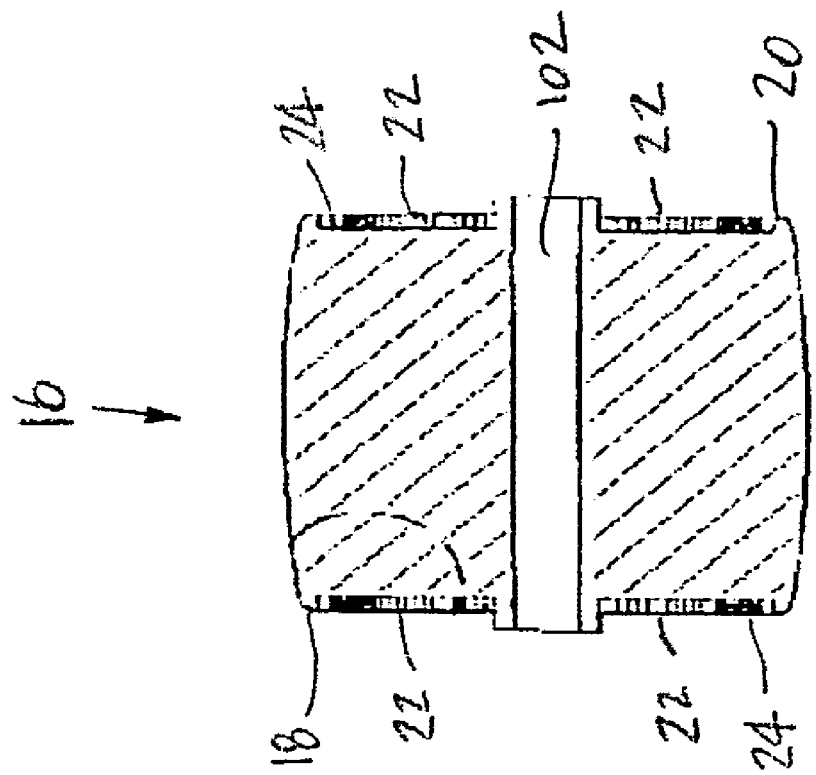
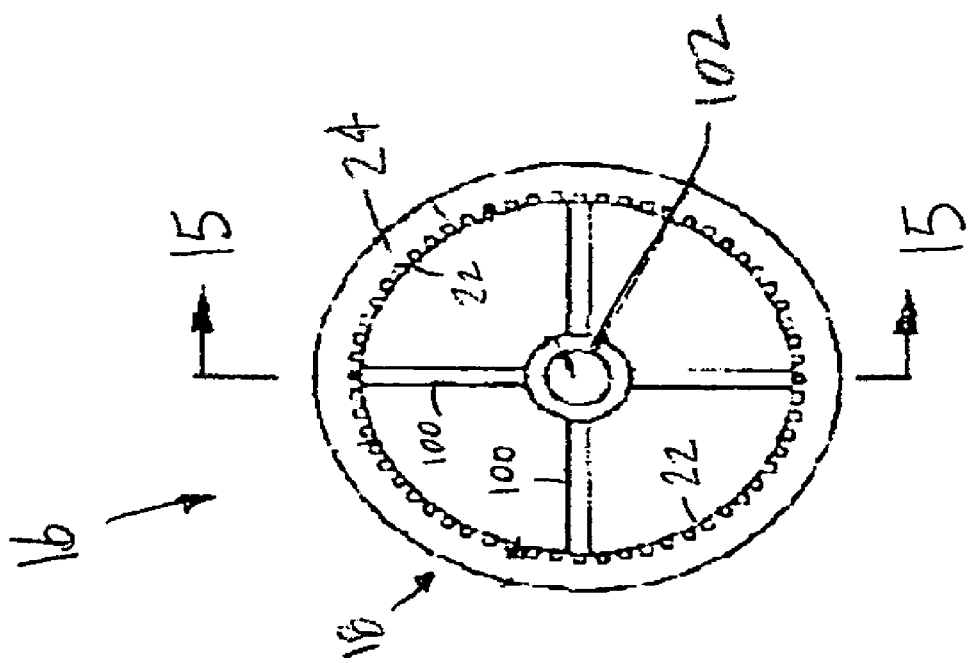
Fig. 15
Fig. 14

CASTER BRAKE ASSEMBLY

BACKGROUND

This disclosure relates to a wheel caster assembly and more particularly to a caster brake assembly for selectively inhibiting movement of a caster.

Casters are used to support and move various equipment or structures such as furniture, chairs, and bed frames. Casters can include one or two wheels and are employed to easily move or roll the structure to which the casters are mounted or attached. Generally, the casters have consisted of a central mounting member having an off-centered stem or a pintle extending up from the central mounting member. One or more wheels are mounted to the central mounting member. The stem is typically inserted into a socket plate that is fixed to a leg or other means of mounting the caster to the structure. In this manner, the caster may swivel to facilitate movement and maneuvering of the structure.

In a particular application, casters have been used on bed frames for many years. A bed frame typically is constructed of various structural members such as side rails and cross members that are connected to the side rails to form a rigid structure that supports a box spring and a mattress. The side rails and the cross members include leg portions that extend downwardly to elevate the structural members above the floor. Each of the leg portions have fitted or inserted therein a caster assembly to provide easy movement of the structural members, the box spring, and the mattress. The caster assembly is usually constructed having a rotatable roller to provide movement of the bed frame. The caster assembly also generally has a stem that fits into a corresponding connector in the leg portion. The caster assembly is capable of pivoting or swiveling through 360 degrees of motion about an axis of the stem.

There are applications when the caster assembly is in place that the caster assembly needs to be prevented from further movement. For example, once a bed is positioned within a room it may be desirable to prevent the bed from further movement. If the bed were close to other furniture or a window it would be advantageous to limit any movement of the bed to guard against contacting or scratching other furniture or breaking the window. Further, caster assemblies may be part of a chair. There are times when movement of the chair needs to be restricted. For example, when standing on the chair to reach a book placed high in a bookshelf movement of the chair should be prevented. In order to inhibit movement of a caster assembly a brake mechanism may be incorporated into the caster assembly. However, known caster assemblies having brake mechanisms are complex and do not sufficiently prevent movement of the caster assembly. Some known caster assemblies having a brake are also difficult to operate.

The present construction is designed to obviate and overcome many of the disadvantages and shortcomings associated with prior casters. In particular, the present construction is a caster brake assembly that has a brake mechanism that locks onto a wheel to prevent movement of the wheel.

SUMMARY

In one form of the present disclosure, a caster brake assembly comprises a yoke having a stem, a wheel rotatably supported by the yoke the wheel having a pair of interior rims with the rims having teeth, and a lock lever installed on the yoke having gears that are adapted to engage the teeth to prevent movement of the wheel.

In another form of the present disclosure, a caster brake assembly comprises a yoke member having a stem, a wheel rotatably supported on the yoke by an axle, the wheel having a pair of peripheral edges with the edges having teeth, and a lock lever installed on the yoke having gears that are adapted to engage the teeth to inhibit rotation of the wheel.

In yet another form of the present disclosure, a caster brake assembly comprises a yoke member having a stem, an insert adapted to be placed on the stem, a wheel rotatably supported on the yoke by an axle, the wheel having a pair of interior peripheral edges with the edges having teeth, and a lock lever installed on the yoke having gears that are adapted to engage the teeth to inhibit rotation of the wheel.

In light of the foregoing comments, it will be recognized that the present disclosure provides a caster brake assembly having a brake which is of simple construction and design and which can be easily employed with highly reliable results.

The present disclosure provides a caster brake assembly having a brake that is easy to operate.

The present disclosure provides a caster brake assembly that is capable of being manufactured using commonly available components that are relatively inexpensive.

The present disclosure provides a caster brake assembly that is capable of rotating a full 360 degrees.

The present disclosure also provides a caster brake assembly in which the brake or lock lever includes gears that engage teeth incorporated in a wheel.

The present disclosure provides a caster brake assembly that has increased strength, reliability, and durability.

The present disclosure provides a caster brake assembly that has a stem portion that is molded into a yoke for increased strength and reliability instead of being a compression fit.

The present disclosure will become apparent after considering the following detailed specification in conjunction with the accompanying drawings, wherein:

BRIEF DESCRIPTION OF THE DRAWINGS

FIG. 1 is a perspective view of a preferred embodiment of a caster brake assembly constructed according to the present disclosure;

FIG. 2 is a side perspective view of the caster brake assembly shown in FIG. 1;

FIG. 3 is a perspective view of a yoke constructed according to the present disclosure;

FIG. 4 is rear side view of the yoke shown in FIG. 3;

FIG. 5 is a cross sectional view of the yoke taken along the plane of line 5-5 in FIG. 4;

FIG. 6 is a cross sectional view of the yoke taken along the plane of line 6-6 in FIG. 5;

FIG. 7 is a cross sectional view of the yoke taken along the plane of line 7-7 in FIG. 6;

FIG. 14 is a side view of the wheel shown in FIG. 13;

FIG. 15 is a cross sectional view of the wheel taken along the plane of line 15-15 of FIG. 14.

DETAILED DESCRIPTION OF EMBODIMENTS

Figure 8:
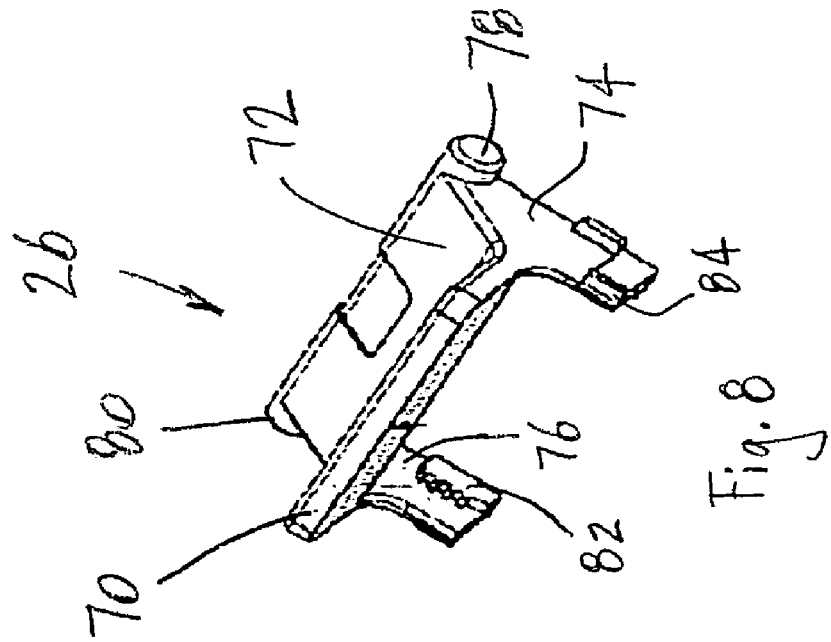
FIG. 8 is a perspective view of a lock lever constructed according to the present disclosure.

Referring now to the drawings, wherein like numbers refer to like items, number 10 identifies a preferred embodiment of a caster brake assembly constructed according to the present disclosure. With reference now to FIGS. 1 and 2, the caster brake assembly 10 is shown comprising a yoke 12 having a socket stem member 14 molded into the yoke 12 instead of being inserted or a compression fit. A wheel 16 is rotatably supported in the yoke 12. The wheel 16 has a pair of interior rims 18 and 20 with each of the rims 18 and 20 having teeth 22 formed along a peripheral edge 24. A lock lever or brake 26 is installed on the yoke 12 and is adapted to engage the teeth 22 to prevent or inhibit rotation or movement of the wheel 16. The stem member 14 may be inserted into a piece of furniture such as a bed frame or a chair or into a socket insert (not shown) that is inserted into a piece of furniture.

With reference now to FIGS. 3-7, the yoke 12 is illustrated comprising a central member 40 having a pair of side members 42 and 44, a front side 46, and a rear side 48. Each of the side members 42 and 44 has an interior side 50 having a first pocket or groove 52 for receiving an axle (not shown). A second pocket or vertically extending elongated groove 54 is formed in each of the interior sides 50 and is adapted to receive the lock lever 26. A third pocket or recess 56 is formed in each of the interior sides 50 and a ledge 58 is also formed between the second pocket 54 and the third pocket 56. The ledge 58 is used to trap or capture a portion of the lock lever 26 within the third pocket 56, as will be explained more fully herein. The central member 40 has an interior side 60 that has a first support rib 62 that extends between the front side 46 and the rear side 48. A second supporting rib 64 is formed in the interior side 60 and extends between the pair of sides 42 and 44. The ribs 62 and 64 cross each other on the interior side 60. An opening 66 is provided in the central member 40 for receiving the socket stem member 14. Each of the sides 42 and 44 has a hub portion 68 that extends out from each of the sides 42 and 44.

FIG. 8 depicts the lock lever or brake 26 which has a tab portion 70 that is adapted to be engaged by a hand or a foot, a central portion 72, and a pair of side arms 74 and 76. Each of the side arms 74 and 76 has a pivot pin 78 and 80, respectively. The pivot pins 78 and 80 are sized and shaped to fit into the second pockets 54 of the yoke 12. Each of the side arms 74 and 76 also has a gear member 82 that are capable of engaging the teeth 22 of the wheel 16. Further, each of the side arms 74 and 76 has a tab member 84 that is adapted to be captured in the pockets 54 and 56 and to engage the ledge 58.

Figure 9:
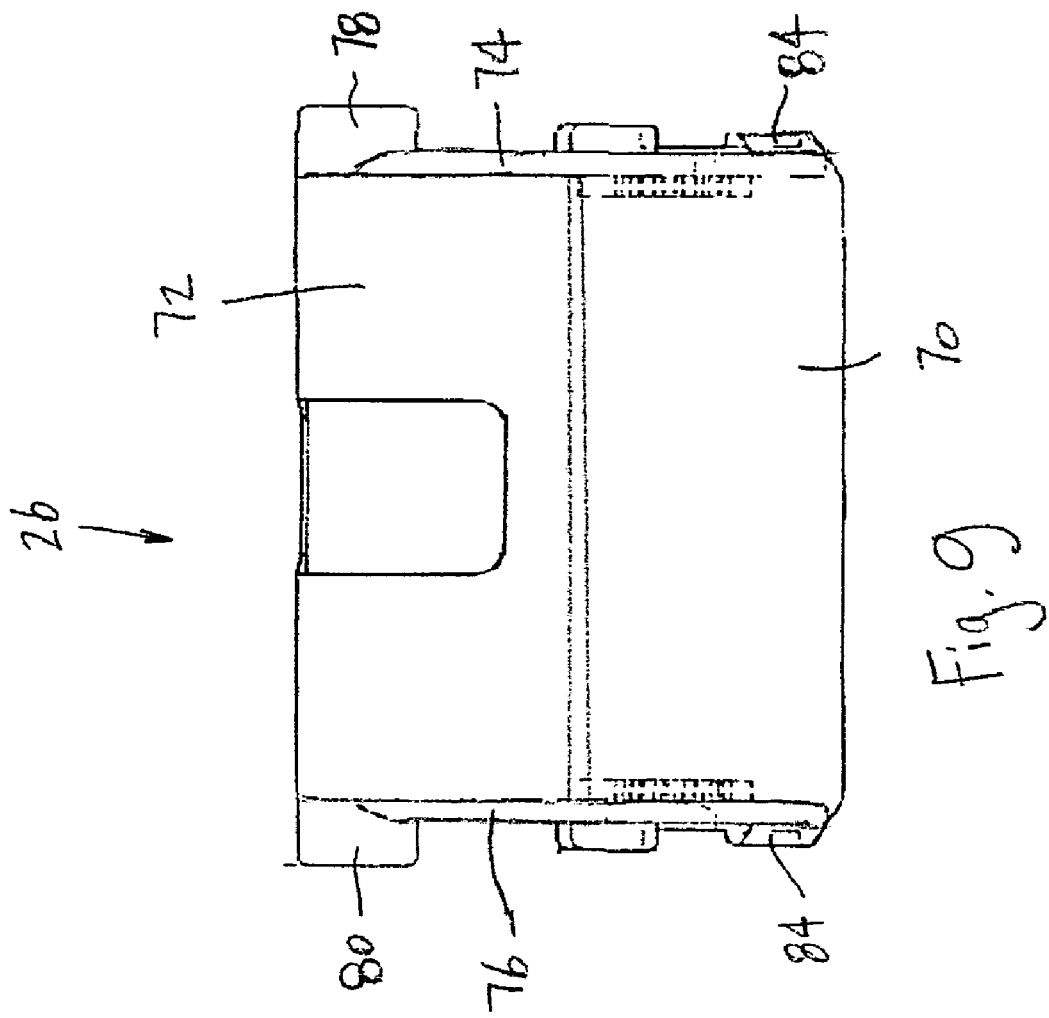
FIG. 9 is an enlarged top view of the lock lever shown in FIG. 8.

FIG. 9 illustrates a top view of the lock lever 26. The lock lever 26 has the tab portion 70 that extends out of the yoke 12 when the assembly 10 is fully assembled. The tab portion 70 is thus exposed for a user to exert pressure or a force on the tab portion 70. Although not shown, the tab portion 70 may have instructions formed, printed, or labeled thereon such as lift to engage.

Figure 10:
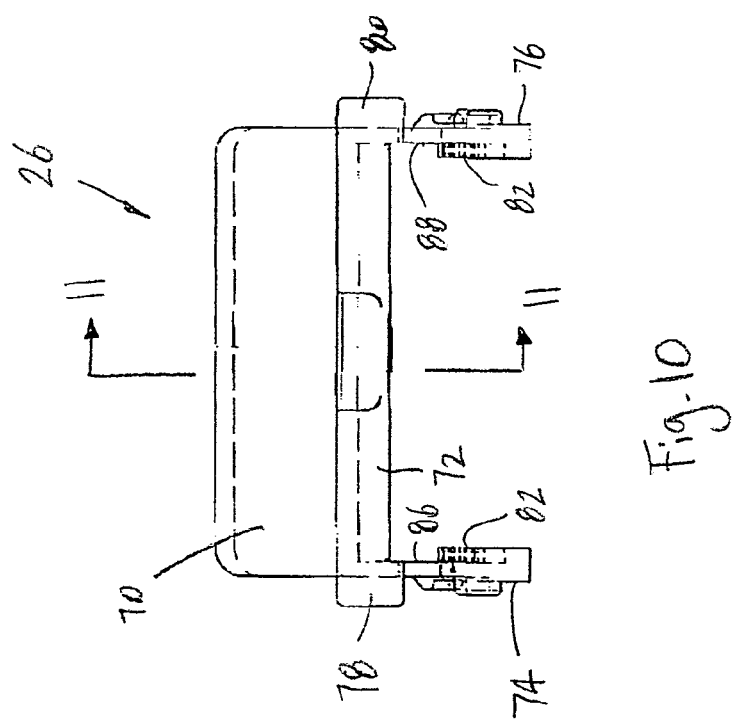
FIG. 10 is an enlarged rear view of the lock lever shown in FIG. 8.

Referring now to FIG. 10, a rear view of the lock lever 26 is shown. The lock lever 26 has the gear members 82 on an interior 86 of the side arm 74 and on an interior 88 of the side arm 76. The gear members 82 are adapted to engage the teeth 22 associated with the wheel 16. With the gear members 82 on the interiors 86 and 88 the gear members 82 are capable of engaging the teeth 22.

Figure 11:
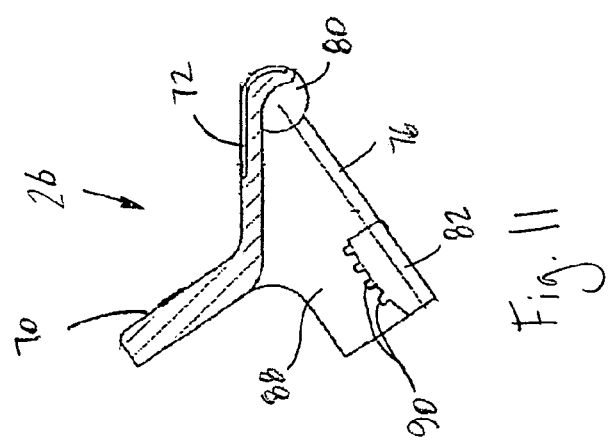
FIG. 11 is a cross section view of the lock lever taken along the plane of line 11-11 in FIG. 10.

FIG. 11 illustrates the gear member 82 on the interior 88 of the side arm 76. The gear member 82 has teeth 90 that are sized and shaped to mesh with the teeth 22 on the wheel 16.

Figure 12:
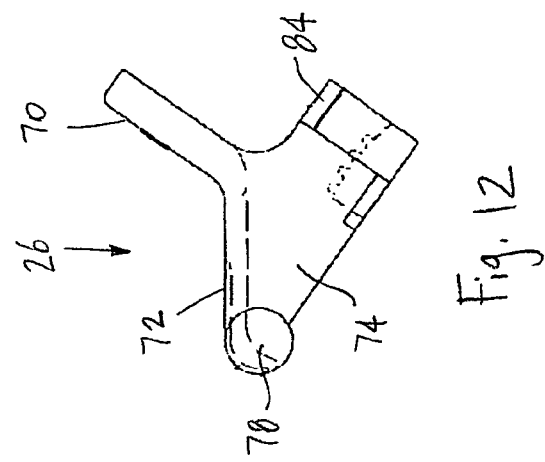
FIG. 12 is an enlarged side view of the lock lever shown in FIG. 8.

Referring now to FIG. 12, a side view of the lock lever 26 is shown. The lock lever 26 has the tab portion 70, the central portion 72, the side arm 74, and the pivot pin 78. The lock lever 26 also has the tab member 84. The tab member 84 is adapted to engage the ledge 58 and to be able to slide pass the ledge 58 to be positioned in the third pocket 56. The tab member 84 is also adapted to be able to slide pass the ledge 58 to be repositioned in the second pocket 54.

Figure 13:
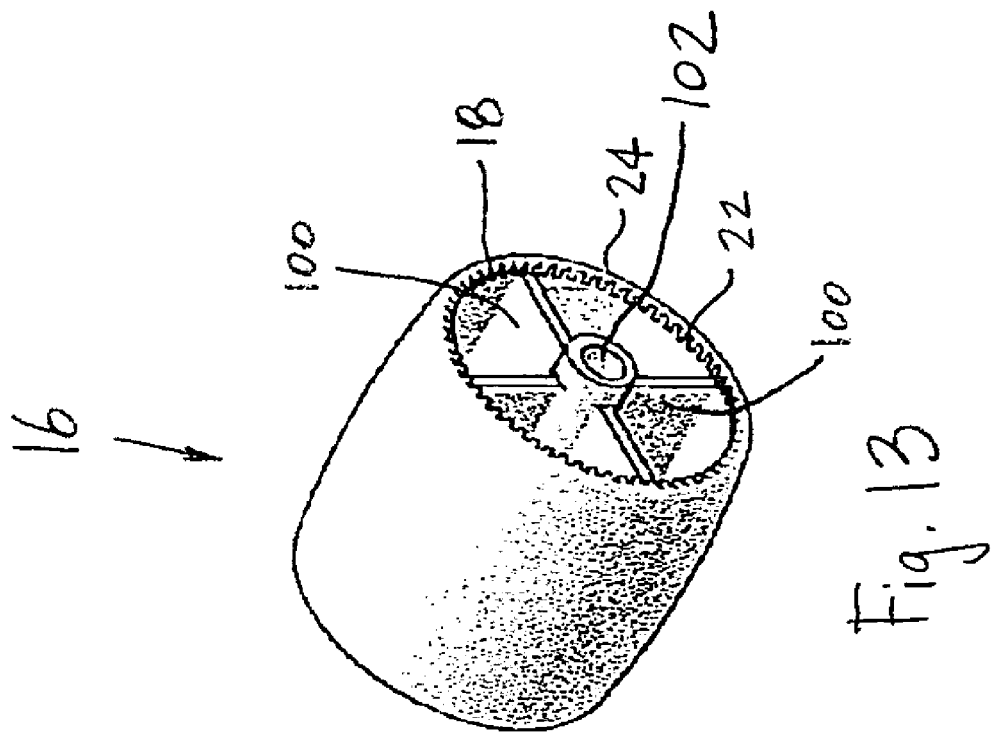
FIG. 13 is a perspective view of the wheel constructed according to the present disclosure.

With particular reference now to FIGS. 13-15, the wheel 16 is illustrated. The wheel 16 has the pair of rims 18 and 20 with each of the rims 18 and 20 having teeth 22 formed along the peripheral edges 24. Each of the rims 18 and 20 may have a number of reinforcing ribs 100 radially extending out from a central hub portion 102 much like spokes. The ribs 100 do not extend out to the edges 18 and 20 because if the ribs 100 did the ribs 100 would interfere with the teeth 90 of the gear members 82. Although not shown, an axle may be positioned within the hub 102 to hold the wheel 16 in the yoke 12 so that the wheel can rotate within the yoke 12. Although the wheel 16 is shown as being somewhat hollow, it is also possible for the wheel 16 to be solid in construction.

Figure 16:
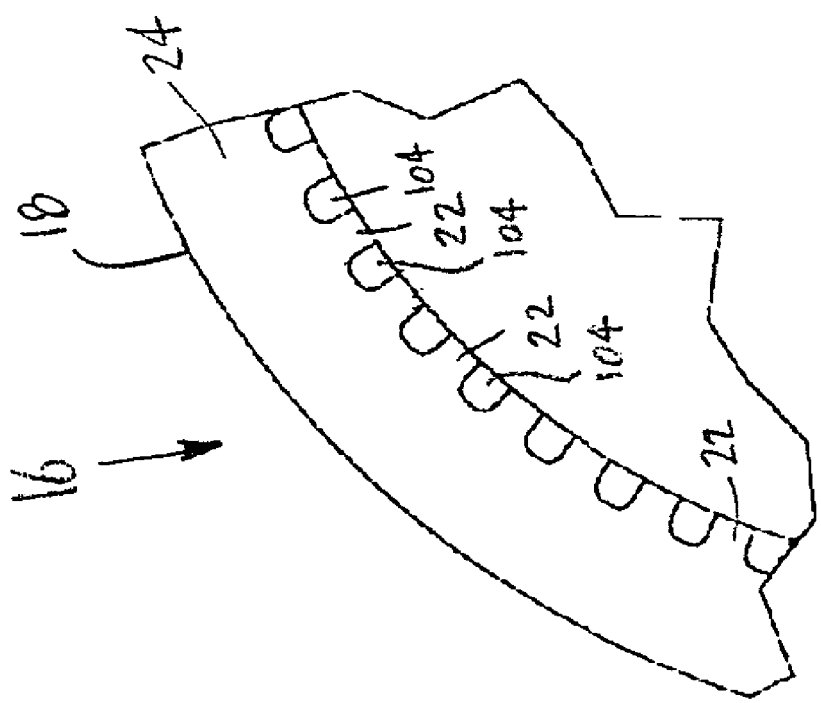
FIG. 16 is an enlarged partial view of a rim of the wheel shown in FIG. 13.

FIG. 16 illustrates an enlarged view of the teeth 22 associated with the wheel 16. Between each of the teeth 22 are spaces or recesses 104 that are sized and shaped to allow the teeth 90 of the gear members 82 to fit there between to mesh with the teeth 22.

The caster brake assembly 10 operates as follows. When the lock lever 26 is in the unlocked position, as shown in FIGS. 1 and 2, the gear members 90 are not engaged with the teeth 22 and the wheel 16 is free to rotate. Each of the tab members 84 are within the second pockets 54 of the yoke 12. Once the tab portion 70 is moved upwardly the tab members 84 slide pass the ledges 58 of the yoke 12 and the tab members 84 are then positioned in the third pocket 56. The ledges 58 present a bias to the tab members 84 and enough force on the tab portion 70 will move the tab members 84 pass the bias of the ledges 58. The side arms 74 and 76 of the lock lever 26 are resilient and this allows the tab members 84 to move against the ledges 58 between the second pockets 54 and the third pockets 56. The gear members 82 are also then meshed with the teeth 22 of the wheel 16. In this position the wheel 16 is locked in place and the wheel 16 cannot rotate or move. To unlock the assembly 10 the tab portion 70 is moved downwardly so that the tab members 84 slide pass the ledges 58 to reposition the tab members 84 into the second pockets 54. Once the tab members 84 are in the second pockets 54 the teeth 90 of the gear members 82 disengage with the teeth 22 of the wheel 16. With the gear members 82 disengaged the wheel 16 is free to rotate.

From all that has been said, it will be clear that there has thus been shown and described herein a caster brake assembly. It will become apparent to those skilled in the art, however, that many changes, modifications, variations, and other uses and applications of the subject caster brake assembly are possible and contemplated. All changes, modifications, variations, and other uses and applications which do not depart from the spirit and scope of the subject caster brake assembly are deemed to be covered by the disclosure, which is limited only by the claims which follow.

What is claimed is:

1. A caster brake assembly comprising:
a yoke having a stem, a pair of side members each having an interior side with each interior side having a first pocket, a second pocket, a third pocket, and a ledge formed between the second pocket and the third pocket;

a wheel rotatably supported by the yoke the wheel having a pair of interior rims with the rims having teeth; and a lock lever installed on the yoke having gears that are adapted to engage the teeth to prevent movement of the wheel.

2. The caster brake assembly of claim 1 wherein the lock lever comprises a tab portion for moving the gears into engagement with the teeth.

3. The caster brake assembly of claim 1 wherein the lock lever comprises a pair of arms with each of the arms having a pivot pin for being positioned in the second pocket and a tab member adapted for being captured in the third pocket when the gears engage the teeth and in the second pocket when the gears do not engage the teeth.

4. The caster brake assembly of claim 1 wherein the lock lever comprises a tab portion and a pair of arms with each of the arms having a tab member adapted for being captured in the third pocket and the tab portion is adapted to be displaced from a locked position in which the gears engage the teeth and an unlocked position in which the gears do not engage the teeth.

5. The caster brake assembly of claim 1 wherein the lock lever comprises a tab portion and a pair of arms with each of the arms having a tab member adapted for being captured in the third pocket and the tab portion is lifted upwardly for the gears to engage the teeth.

6. The caster brake assembly of claim 1 wherein the lock lever comprises a tab portion and a pair of side arms with each of the side arms having a tab member adapted for being captured in the third pocket with each of the ledges preventing the tab members from being repositioned in the second pocket.

7. The caster brake assembly of claim 1 wherein the teeth extend along the entire rim of each of the rims of the wheel.

8. The caster brake assembly of claim 1 wherein the lock lever comprises a tab portion and a pair of side arms with each of the side arms having a tab member adapted for being captured in the second pocket with each of the ledges preventing the tab members from being repositioned in the third pocket.

9. A caster brake assembly comprising:

a yoke member having a stem, a pair of side members each having an interior side with each interior side having a first pocket, a second pocket, a third pocket, and a ledge formed between the second pocket and the third pocket;

a wheel rotatably supported on the yoke by an axle with the axle being positioned within the first pocket in each of the interior sides, the wheel having a pair of peripheral edges with the edges having teeth; and a lock lever installed on the yoke having gears that are adapted to engage the teeth to inhibit rotation of the wheel.

10. The caster brake assembly of claim 9 wherein the lock lever comprises a tab portion for moving the gears into engagement with the teeth.

11. The caster brake assembly of claim 9 wherein the lock lever comprises a pair of arms with each of the arms having a pivot pin for being positioned in the second pocket and a tab member adapted for being captured in the third pocket when the gears engage the teeth and in the second pocket when the gears do not engage the teeth.

12. The caster brake assembly of claim 9 wherein the lock lever comprises a tab portion and a pair of arms with each of the arms having a tab member adapted for being captured in the third pocket and the tab portion is adapted to be displaced from a locked position in which the gears engage the teeth and an unlocked position in which the gears do not engage the teeth.

13. The caster brake assembly of claim 9 wherein the lock lever comprises a tab portion and a pair of arms with each of the arms having a tab member adapted for being captured in the third pocket and the tab portion is lifted upwardly for the gears to engage the teeth.

14. The caster brake assembly of claim 9 wherein the lock lever comprises a tab portion and a pair of side arms with each of the side arms having a tab member adapted for being captured in the third pocket with each of the ledges preventing the tab members from being repositioned in the second pocket.

15. The caster brake assembly of claim 9 wherein the lock lever comprises a tab portion and a pair of side arms with each of the side arms having a tab member adapted for being captured in the second pocket with each of the ledges preventing the tab members from being repositioned in the third pocket.

16. The caster brake assembly of claim 9 wherein the lock lever comprises a central portion, tab portion extending out from the central portion, a pair of side arms with each side arm having a pivot pin and a tab member with each tab member extending out from the side arm, each tab member adapted for being captured in the second pocket when the gears do not engage the teeth or in the third pocket when the gears engage the teeth.

17. The caster brake assembly of claim 9 wherein the teeth extend along the entire edges of the wheel.

18. A caster brake assembly comprising:

a yoke member having a stem, a pair of side members each having an interior side with each interior side having a first pocket, a second pocket, a third pocket, and a ledge formed between the second pocket and the third pocket;

a socket insert adapted to be placed on the stem;

a wheel rotatably supported on the yoke by an axle with the axle being positioned within the first pocket in each of the interior sides, the wheel having a pair of interior peripheral edges with the edges having teeth; and a lock lever installed on the yoke in the second pocket having gears that are adapted to engage the teeth to inhibit rotation of the wheel.

19. The caster brake assembly of claim 18 wherein the lock lever comprises a tab portion and a pair of side arms with each of the side arms having a tab member adapted for being captured in the third pocket with each of the ledges preventing the tab members from being repositioned in the second pocket.

20. The caster brake assembly of claim 18 wherein the lock lever comprises a pair of arms with each of the arms having a pivot pin and a tab member adapted for being captured in the third pocket when the gears engage the teeth and in the second pocket when the gears do not engage the teeth.

* * * * *